(12) United States Patent
Kim

(10) Patent No.: US 7,621,012 B2
(45) Date of Patent: Nov. 24, 2009

(54) CONTROLLER EFFECTIVELY CONTROLLING THE POWER FOR A WASHING MACHINE OR A DRYER, AND A METHOD FOR DOING THE SAME

(75) Inventor: Byung Chan Kim, Miryang-si (KR)

(73) Assignee: LG Electronics Inc., Seoul (KR)

( * ) Notice: Subject to any disclaimer, the term of this patent is extended or adjusted under 35 U.S.C. 154(b) by 609 days.

(21) Appl. No.: 11/269,838

(22) Filed: Nov. 9, 2005

(65) Prior Publication Data

US 2006/0117491 A1    Jun. 8, 2006

(30) Foreign Application Priority Data

Nov. 11, 2004    (KR) .................. 10-2004-0091991

(51) Int. Cl.
  *A01H 5/02*    (2006.01)
  *D06F 33/00*    (2006.01)
(52) U.S. Cl. .......................... 8/147; 68/12.02
(58) Field of Classification Search ............... 68/147, 68/158, 159; 8/12.01, 12.02, 13 R
  See application file for complete search history.

(56) References Cited

U.S. PATENT DOCUMENTS

| | | | | |
|---|---|---|---|---|
| 4,104,542 A | * | 8/1978 | Karklys et al. ............ 307/141 |
| 4,735,219 A | * | 4/1988 | Seeland ................... 134/56 R |
| 4,977,394 A | * | 12/1990 | Manson et al. ............. 340/679 |
| 4,982,468 A | * | 1/1991 | Takahashi et al. ............. 8/159 |
| 5,038,807 A | * | 8/1991 | Bailey et al. .............. 134/57 D |
| 5,101,191 A | * | 3/1992 | MacFadyen et al. ......... 375/259 |
| 5,150,489 A | * | 9/1992 | Kaji et al. .................... 8/159 |
| 5,390,385 A | * | 2/1995 | Beldham .................... 8/158 |
| 5,400,246 A | * | 3/1995 | Wilson et al. ................ 700/17 |
| 5,424,940 A | * | 6/1995 | Ousborne .................... 700/1 |
| 7,420,293 B2 | * | 9/2008 | Donnelly et al. ............. 307/34 |
| 7,464,426 B2 | * | 12/2008 | Lee et al. ..................... 8/147 |
| 2005/0116814 A1 | * | 6/2005 | Rodgers et al. ......... 340/310.01 |
| 2005/0187727 A1 | * | 8/2005 | Weik et al. ................... 702/61 |

* cited by examiner

*Primary Examiner*—Michael Barr
*Assistant Examiner*—Rita R Patel
(74) *Attorney, Agent, or Firm*—Birch, Stewart, Kolasch & Birch, LLP

(57) ABSTRACT

The present invention relates to a controller effectively controlling the power for a washing machine and a drier, and a method of doing the same. More particularly, it relates to a controller for a washing machine or a dryer, and a method for supplying the power so that a washing machine and a drier as a one body may perform an optimal efficiency in a range of a current limit, when supplied the power by the same power source. A controller for a washing machine comprising a micom; and communication means for communicating with a controller of a dryer. A controller for a dryer comprising a micom; and communication means for communicating with the controller of the washing machine.

5 Claims, 5 Drawing Sheets

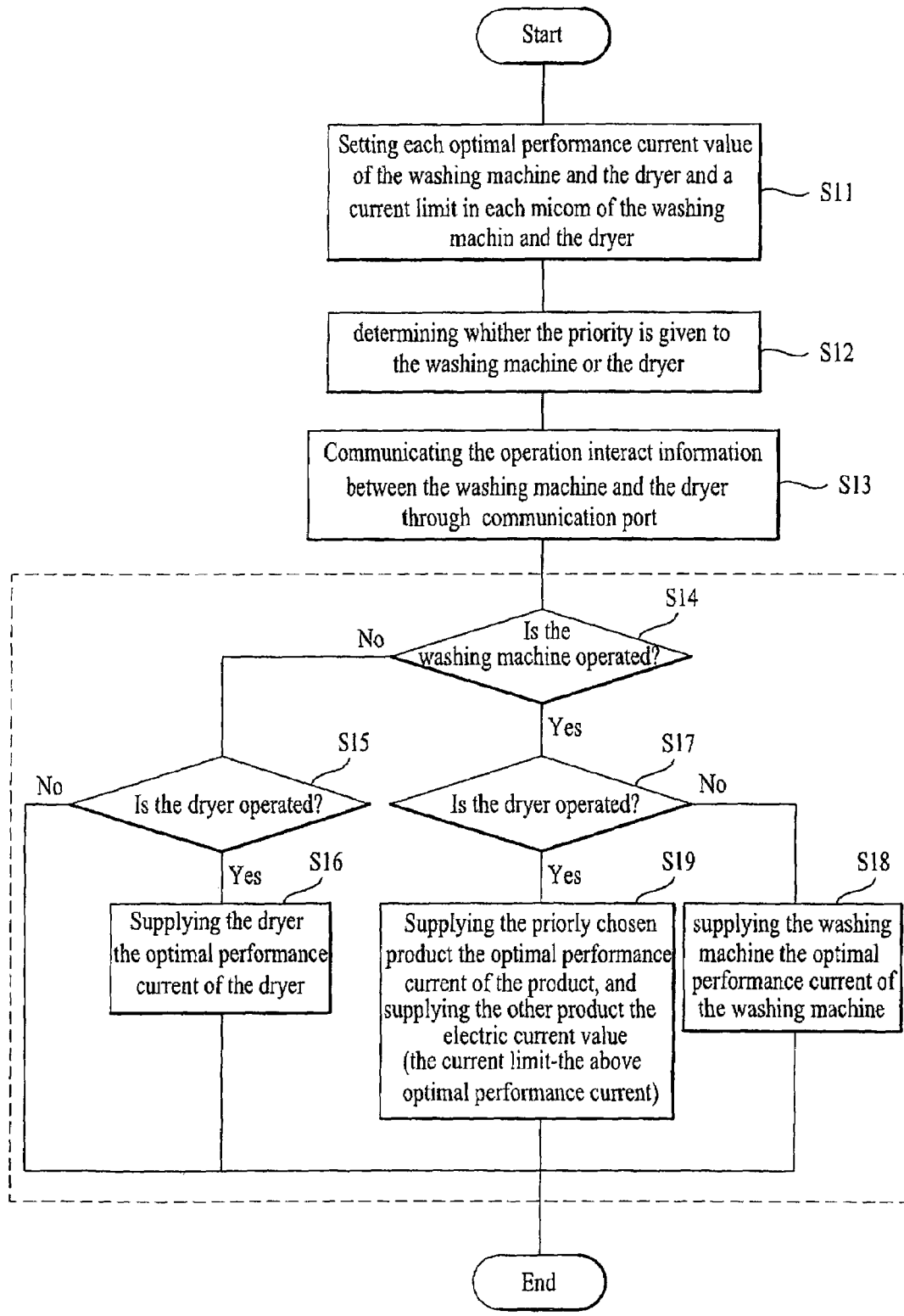

CONTROLLER EFFECTIVELY CONTROLLING THE POWER FOR A WASHING MACHINE OR A DRYER, AND A METHOD FOR DOING THE SAME

This application claims the benefit of the Patent Korean Application No. P2004-091991, filed on Nov. 11, 2005, which is hereby incorporated by reference as if fully set forth herein.

BACKGROUND OF THE INVENTION

1. Field of the Invention

The present invention relates to a controller effectively controlling the power for a washing machine or a drier, and a method of doing the same, and more particularly, to a controller for a washing machine or a dryer, and a method for supplying the power so that a washing machine and a drier as a one body may perform an optimal efficiency in a range of a current limit, when supplied the power by the same power source.

2. Discussion of the Related Art

FIG. 1 is a diagram illustrating a related art device combining a washing machine and a dryer.

As sown in FIG. 1, a washing machine 10 and a dryer 20 are included. At a top of the washing machine 10 are formed a display part 11 for displaying operation of the washing machine and an opening part 12 for having the laundry loaded therein or vice versa. At a top of the dryer are formed a display part 21 for displaying operation of the dryer 20 and an opening part 22 for having the laundry loaded therein or vice versa.

In general, every electric home appliance has an optimal performance current for performing the optimal efficiency. There are some cases of not supplying an optimal performance current due to other reasons, and that is caused by a current limit.

The current limit is an electric current value limited for securing the customer, preventing a fire caused by overheating an electric home appliance, and an accident of an electric shock caused by electric leakage due to overflowing currents in the electric home appliances. A designer of an electric home appliance should set an optimal performance current in a range of a current limit value. Especially, the sum total of the whole currents for an electric home appliance combining more than two products should not exceed the current limit, even in case that the more than two machines are put into operation at the same time.

For example, under the regulations a current limit of an average American house should not exceed 15 amps (A), and in that case, the sum total of a current consumption for the electric home appliance should not exceed 15 amps.

For example, when designing a device combining a washing machine and a dryer, the current consumption in case of putting the washing machine and the dryer into operation at the same time should meet the current limit. Thus, each electric home appliance has an optimal performance current, and since the security of the costumers has to be put into consideration, the device should be designed to find an optimum level between its optimal performance current and the current limit and to perform the optimal efficiency within the range.

Generally, the optimal performance current is determined by independent operation of each product. If more than two products are operated at the same time and the current value satisfying each optimal performance current of the products is provided, the current value would exceed the current limits of the products. Also, even in case that each product is not operated at the same time to satisfy the current limit values of each product, an amount of currents is reduced in advance, preparing against the case of operating the products simultaneously. Thereby permanent current loss may be cased as shown in FIG. 2.

Referring to FIG. 2, a method of supplying the power for the related art washing machine and dryer will be described.

A product 1 (a washing machine) and a product 2 (a dryer) drive by means of lower currents 32 and 42 than each optimal performance current thereof 33 and 43, even when the product 1 and 2 are operated separately. That is, even when either of the two products is operated, the two products are designed to drive by the regularly lower currents 32 and 42 than the optimal performance currents 33 and 43 for being prepared against the case of operating the two products simultaneously. Thus, the following problem may be caused. Since the current loss 31 and 41 of the products are expected in advance, neither of the two products may perform its optimal efficiency although either of the products is operated.

SUMMARY OF THE INVENTION

Accordingly, the present invention is directed to a controller effectively controlling the power for a washing machine or a dryer, and a method for doing the same.

An object of the present invention is to provide a method of controlling the power for a washing machine or a dryer to be operated at an optimal performance in a range satisfying a current limit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a controller for a washing machine comprising a micom wherein an optimal performance current value for the washing machine and an electric current limit for concurrent operation of the washing machine and a dryer are set therein; and communication means for communicating with a controller of the dryer, wherein the micom determines through the communication with the dryer the electric current value to be supplied to the washing machine according to an operation state of the dryer.

The micom determines the electric current value to be supplied to the washing machine as the optimal performance current value of the washing machine, once a motor for driving a drum of the dryer is judged not to be operated.

Also, the micom determines the electric current value to be supplied to the washing machine, corresponding to a ratio of between the optimal performance current values of the dryer and the washing machine, once the motor for driving the drum of the dryer is judged to be operated.

Alternatively, the micom determines the electric current value to be supplied to the washing machine as one of the optimal performance current value of the washing machine and the electric current value given after subtracting the optimal performance current value of the dryer from the current limit value, once the motor for driving the drum of the dryer is judged to be operated. As described above, the determination may be made by setting it in the micom in advance, or by inputting it outside, for example, an input button or determination means such as an auxiliary home network.

In another aspect of the present invention, a controller for a dryer comprising a micom wherein an optimal performance current value for the dryer and an electric current limit for concurrent operation of the washing machine and the dryer are set therein; and communication means for communicating with the controller of the washing machine. The micom determines through the communication with the washing machine the electric current value to be supplied to the dryer according to an operation state of the washing machine.

Just like in the controller of the washing machine, the micom of the controller for the dryer determines the electric current value to be supplied to the dryer as the optimal performance current value of the dryer, once a motor for driving the drum of the washing machine is judged not to be operated.

Also, the micom determines the electric current value to be supplied to the dryer out of the electric current limit, corresponding to a ratio of the optimal performance current values between the dryer and the washing machine, once the motor for driving the drum of the washing machine is judged to be operated.

Alternatively, the micom determines the electric current value to be supplied to the dryer as one of the optimal performance current value of the dryer and the electric current value given after subtracting the optimal performance current value of the washing machine from the current limit value, once the motor for driving the drum of the washing machine is judged to be operated. The determination may be made by setting it in the micom in advance, or by inputting it outside as described above in the controller of the washing machine.

On the other hand, a method of controlling the power for a washing machine or a dryer comprising a first step; a second step; and a third step. The first step is for setting in the micom each optimal performance current value of the washing machine and the dryer, and a current limit value for the washing machine and the dryer to be operated safely when operating the washing machine and the dryer simultaneously. Hence, the second step is for exchanging and communicating operation information of the washing machine and the dryer by using a communication port connected to each micom of the washing machine and the dryer. The third step is for of supplying currents to the washing machine and the dryer in a range of the current limit according to the operation information.

In the third step, in case only the washing machine is operated, the washing machine is supplied its optimal performance current value. In case only the dryer is operated, the dryer is supplied its optimal performance current value. Then, in case the washing machine and the dryer are operated simultaneously, the current value is divided and supplied to each of the washing machine and the dryer.

In the third step, in case the currents are divided and supplied to each of the washing machine and the dryer, the current limit value is divided by a ratio of each optimal performance current value of the washing machine and the dryer.

Furthermore, a priority setting step of setting priority is further comprised between the first and second step. Thus, in case the washing machine and the dryer are operated simultaneously in the third step, one of the washing machine and the dryer chosen by the priority in the priority setting step is supplied its optimal performance current, and the other product is supplied the currents given after subtracting the optimal performance current value from the current limit value.

In the priority setting step, the priority may be set through a home server of a home network system.

On the other hand, the communication means according to the present invention is employed for communicating if the driving part of the washing machine and the dryer is operated or not. But, the communication means may communicate data more than that.

One example for the washing machine and the dryer to communicating each other will be described. The one product sends an electric signal through a communication cable for allowing the other product to know if a motor of the one product is switched on. Hence, the other product receives the signal to judge of the motor of the one product is operated, and then determines which current value to use.

According to the present invention, in case that one of the products is operated, or the products are operated at the same time, the currents are supplied for performing the optimal efficiency, thereby preventing the permanent current loss. Also, accidents caused by over-supplying currents are prevented, and the security of the customers is kept.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a flow chart illustrating another method of supplying the power for the washing machine and the dryer according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
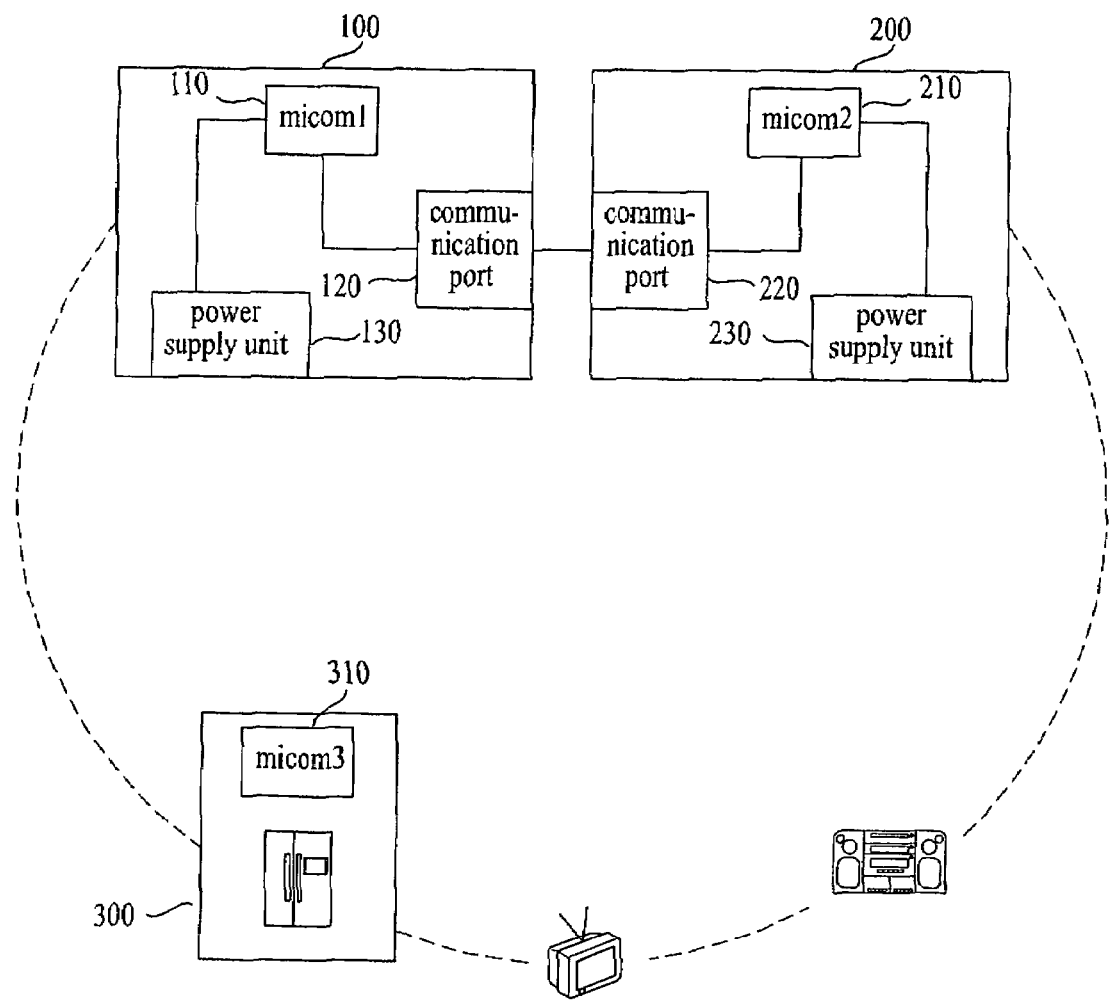
FIG. 4 is a diagram schematically illustrating the method of controlling the power for the washing machine and the dryer according to the present invention.

FIG. 4 is a diagram schematically showing that each controller of a washing machine and a dryer controls the power of the washing machine and the dryer. The controller includes a micom and communication means.

As shown in FIG. 4, the washing machine 100 includes a micom 110, a communication port 120 connected to the micom for communicating with the dryer 200, and a power supply unit 130 for supplying the power to the washing machine.

Also, the dryer 200 includes a micom 210, a communication port 220 connected to the micom for communicating with the washing machine 100, and a power supply unit 130 for supplying the power to the dryer 200.

The communication port 120 of the washing machine and the communication port 220 of the dryer are connected by a communication cable to exchange and communicate operation information each other. The power supply units 130 and the 230 are operated to supply the power needed for each of the washing machine and the dryer by means of the control of each micom 110 and 210.

First of all, each optimal performance current value for the washing machine and the dryer, and a current limit value are set in the each micom 110 and 210. Each optimal performance current value is for the washing machine and the dryer to perform the optimal efficiency, and the current limit value is a maximum vale of currents to use the two products safely when the two products are operated simultaneously.

The micoms 110 and 210 divide the currents supplied to the washing machine and the dryer for performing an optimal efficiency within a range of the current limit, and instruct to supply the currents to the washing machine and the dryer. The micoms 110 and 210 check through the communication ports 120 and 220 in advance whether the washing machine and the dryer are required to be operated or not. If only the washing machine is required to be operated, the micoms 110 instructs the power supply unit 130 to supply the washing machine its optimal performance current. Whereas, if only the dryer is required to be operated, the micom 210 instructs the power supply unit 130 to supply the dryer its optimal performance current. If both of the washing machine and the dryer are required to be operated simultaneously, the micoms 110 and 210 instruct the power supply units 130 and 230 of the washing machine and the dryer to supply the currents that remains after dividing the current limit by each optimal performance current ratio of the washing machine and the dryer to each of the washing machine and the dryer.

Figure 3:
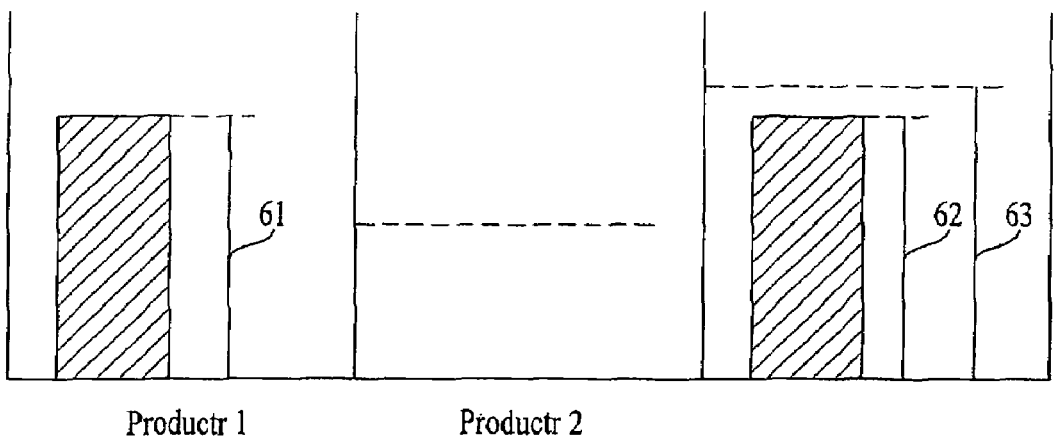
FIG. 3 is a graph of a current when only a washing machine is operated by a method of controlling the power for a washing machine and a dryer according to the present.

Referring to FIG. 3, a case will be described that a product 1 (the washing machine) is operated and a product 2 (the dryer) is not operated.

Once it is judged that the washing machine is required to be operated and the dryer is not, the washing machine is supplied its optimal performance current value 61.

Figure 1:
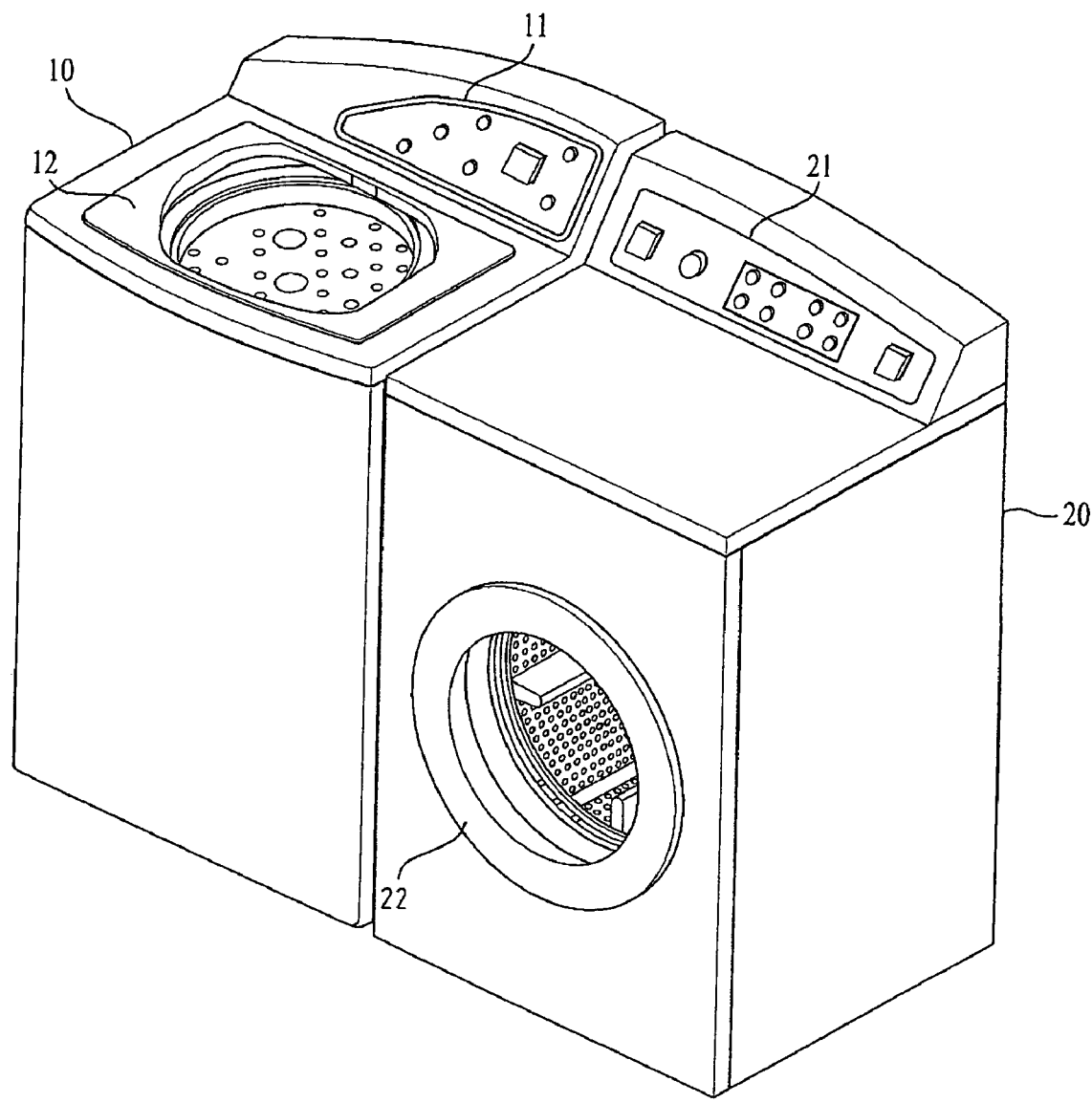
FIG. 1 is a diagram illustrating a configuration of a device combining a conventional washing machine and dryer.
Figure 2:
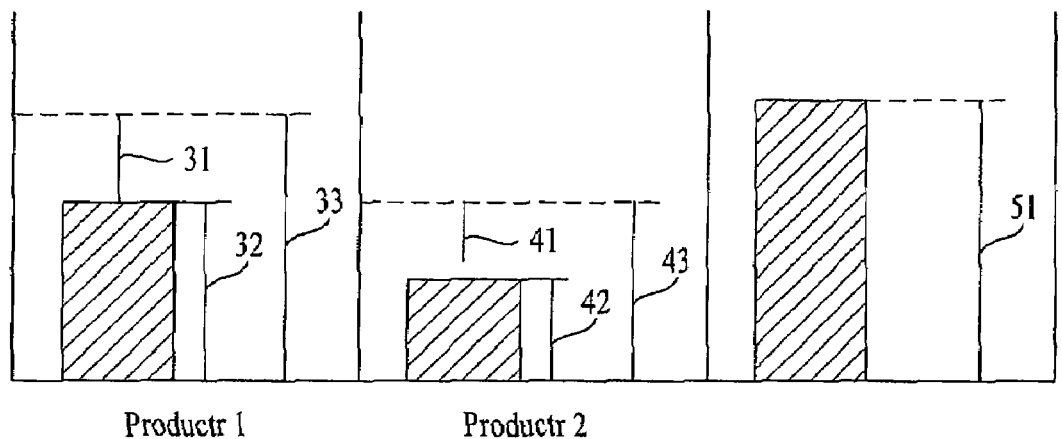
FIG. 2 is a graph illustrating a method of controlling the power for a related art washing machine and dryer.

That is, since the micoms of the products 1 and 2 check the interaction of the products 1 and 2, and supply each optimal performance current of the two products, the permanent current loss 31 and 41 shown in FIG. 2 may not be created. Although the currents are supplied in that way, the currents may not exceed the current limit 63, thereby possible to supply the currents safely and efficiently.

Also, auxiliary control means may be provided outside of the washing machine and the dryer as necessary. The auxiliary control means gives the priority to the washing machine or the dryer, and allows either of the two products 1 and 2 operated by its optimal performance current. Alternatively, the priority may be set in advance in each micom of the products 1 and 2. Alternatively, an input button may be provided for a user to input the priority directly.

FIG. 4 shows a case that the control means is provided by using a home network system. The home network system is a system that controls and manages electric home appliances such as a washing machine, a refrigerator, a television, a VCR, an electric heater, and a lightning unit in a building by using a communication unit such as a mobile phone, and a public phone outside the building after connecting the electric home appliances with a cable or wirelessly.

The home network system requires a home server 300 connected with an outside communication network, for example a refrigerator, for controlling the electric home appliances connected with a home network system and exchanging information. A micom 310 provided in the home server 300 is connected to the micoms 110 and 210 of the washing machine and the dryer in a home network system. The micom 310 also controls the power supply of the two products 1 and 2 according to the present invention.

More specifically, the user inputs the priority into the micom 310 of the home server 300, and then it is determined by the inputted priority which of the washing machine and the dryer is put into operation in its optimal efficiency. In case that the washing machine and the dryer are operated simultaneously, the priority is applied. In that case, the micoms 110 and 210 instruct the power supply unit of the product 1 or 2 determined by the priority to supply its optimal performance current to the product determined by the priority inputted in the micom 310 of the home sever 300. Hence, the micoms 110 and 210 also instruct the power supply unit of the other product 1 or 2 to supply the remaining currents except the optimal performance current to the other product 1 or 2. Thus, the optimal performance current may be supplied to the one product determined prior to the other product.

Figure 5:
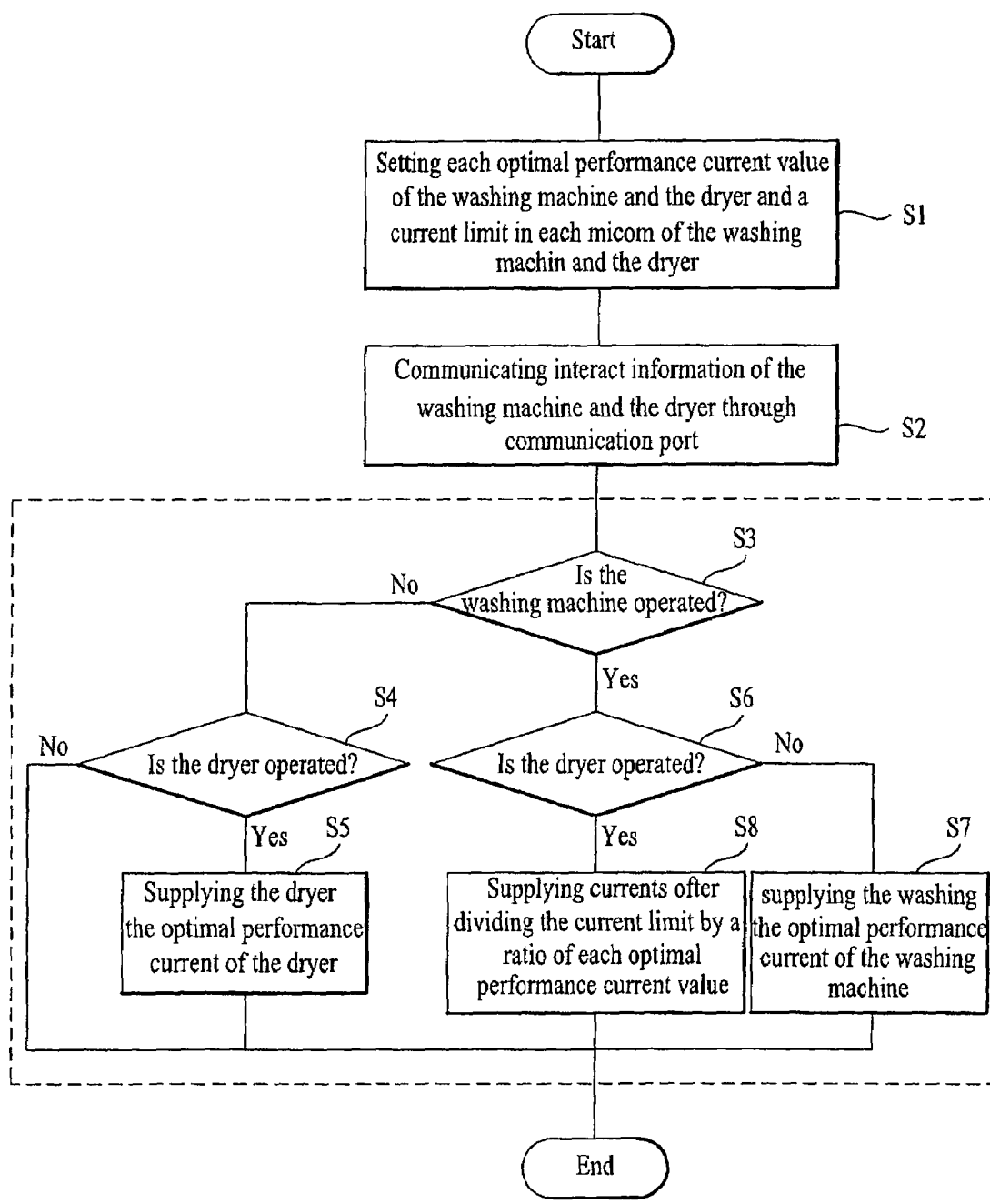
FIG. 5 is a flow chart illustrating the method of controlling the power for the washing machine and the dryer according to the present invention.

Next, referring to FIG. 5, a method of a power supply for a washing machine and a dryer according to the present invention will be described.

First, the method includes a first step (S1) in which a current limit value and each optimal performance current of the washing machine and a dryer are set in micoms each provided in the washing machine and the dryer. The current limit value is a maximum value used in the two products 1 and 2 when the two products 1 and 2 are operated simultaneously, and a value set for the two products to be operated safely. Also, each optimal performance current is a current value designed for each product to perform its optimal efficiency. Each optimal performance current value should be in a range of the current limit value.

Next, a second step (S2) is included in which operation information of the washing machine and the dryer is exchanged and communicated by using communication ports connected each other provided in each micom. The operation information is a signal showing whether the washing machine or the dryer is operated or not.

Next, a third step is included in that currents are supplied in a range of the current limit according to operation information of the washing machine and the dryer.

In the third step, the currents are supplied as follows. First, it is checked if the washing machine is required to be operated (S3). Then, it is checked if the dryer is required to be operated in case that the washing machine is not required to be operated (S4). In case the dryer is required to be operated, the optimal performance current of the dryer is supplied to the dryer (S5).

In the S3 step, in case that the washing machine is required to be operated, it is checked again if the dryer is required to be operated (S6). Judged that the dryer is not required to be operated, the optimal performance current of the washing machine is supplied to the washing machine (S7).

In case that the washing machine and the dryer are all required to be operated, after dividing the current limit by each optimal performance current value of the washing machine and the dryer, the given currents are supplied to each of the washing machine and the dryer (S8).

As shown in FIG. 6, the user may put more emphasis on either of the washing machine and the dryer as necessary, in case that the two products are operated simultaneously. For that, a priority setting step (S12) may be further included between a step (S11) of FIG. 6 corresponding to the step 1 of FIG. 5 and a step (S13) of FIG. 6 corresponding to the step S2 of FIG. 5. In the step (S12), auxiliary control means may be further provided in the washing machine and the dryer for setting the priority. The control means may use the micom in the home server of the home network system for controlling.

When the washing machine and the dryer are operated simultaneously, according to the priority, either of the two products is supplied its optimal performance current. Hence, the other product is supplied the currents given after subtracting its optimal performance from the current limit value (S19).

The method of controlling the power for the washing machine and the dryer according to the present invention may be applied by using a communication module connecting the micoms of the washing machine and the dryer each other, in case that the power is supplied by the same current source after connecting a conventional washing machine and a conventional dryer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling the power for a washing machine and a dryer comprising:
    a first step of setting in a micom each optimal performance current value of the washing machine and the dryer, and a current limit value for the washing machine and the dryer to be operated safely when operating the washing machine and the dryer simultaneously;
    a second step of exchanging and communicating operation information of the washing machine and the dryer by using a communication port connected to each micom of the washing machine and the dryer; and
    a third step of supplying currents to the washing machine and the dryer in a range of the current limit according to the operation information.

2. The method of controlling the power for the washing machine and the dryer of claim 1, wherein in the third step,
    in case only the washing machine is operated, the washing machine is supplied its optimal performance current value,
    in case only the dryer is operated, the dryer is supplied its optimal performance current value, and
    in case the washing machine and the dryer are operated simultaneously, the currents are divided and supplied to each of the washing machine and the dryer.

3. The method of controlling the power for the washing machine and the dryer of claim 2, wherein in the third step,
    in case the currents are divided and supplied to each of the washing machine and the dryer, the current limit value is divided by a ratio of each optimal performance current value of the washing machine and the dryer.

4. The method of controlling the power for the washing machine and the dryer of claim 2, further comprising a priority setting step of setting priority between the first and second step,
    wherein in case the washing machine and the dryer are operated simultaneously in the third step, one of the washing machine and the dryer chosen by the priority in the priority setting step is supplied its optimal performance current, and the other product is supplied the currents given after subtracting the optimal performance current value from the current limit value.

5. The method of controlling the power for the washing machine and the dryer of claim 4, wherein in the priority setting step, the priority is set through a home server of a home network system.

* * * * *